Sept. 28, 1926.
C. W. CROWELL
1,601,111
HEADLIGHT
Filed Oct. 3, 1925
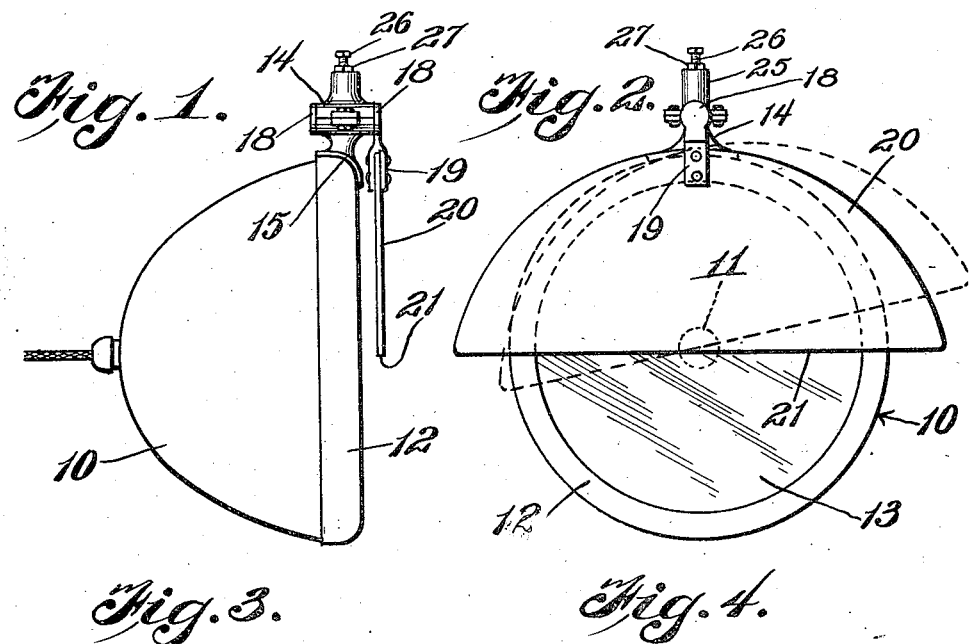
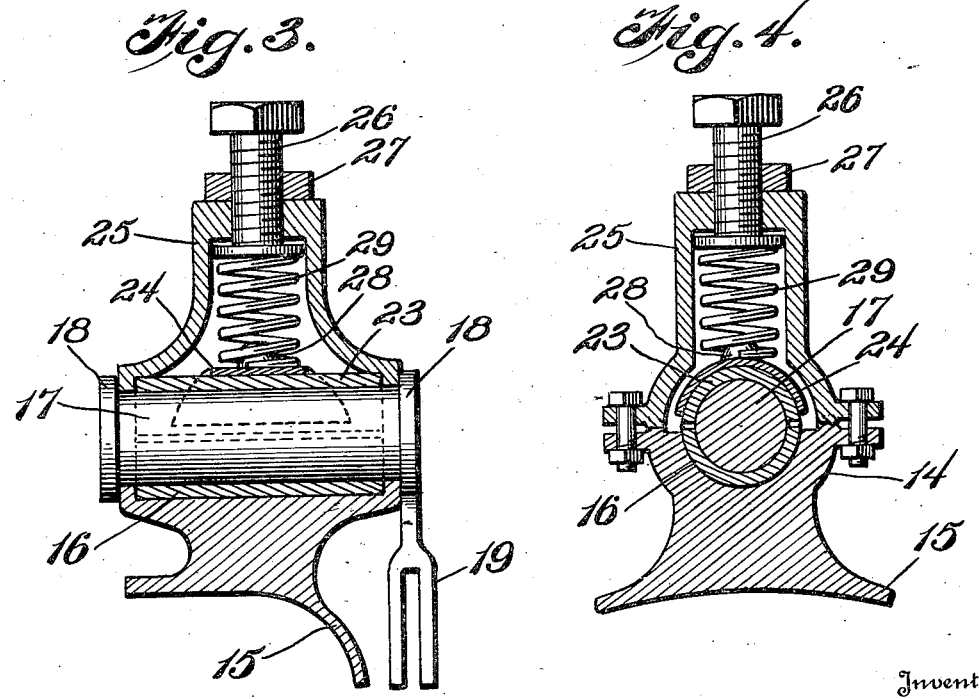
Inventor
Charles W. Crowell
By Watson E. Coleman
Attorney Patented Sept. 28, 1926.

1,601,111

UNITED STATES PATENT OFFICE.

CHARLES W. CROWELL, OF SALISBURY, NORTH CAROLINA.

HEADLIGHT.

Application filed October 3, 1925. Serial No. 60,283.

This invention relates to improvements in headlights and has for an important object thereof the provision of means for cutting off the glaring rays passing from the upper portion of an automobile headlight which is operative regardless of transverse inclination of the vehicle.

It is well known that the ordinary headlight having a fixed translucent or modulating section at the upper half of its lens is only operative as long as the vehicle is not transversely inclined. Immediately upon inclination of the vehicle, this section ceases to be the upper half of the headlight and consequently a portion of the rays from the upper half of the headlight during such inclination escape to dazzle the eyes of drivers of oncoming vehicles.

A further object of the invention is to provide a device of this character which may be readily attached to headlights of the present construction without in any manner altering the same.

These and other objects I attain by the construction shown in the accompanying drawing, wherein for the purpose of illustration is shown a preferred embodiment of my invention and wherein:—

Figure 1 is a side elevation of a headlight having applied thereto a glare shade constructed in accordance with my invention;

Figure 2 is a front elevation thereof;

Figure 3 is a vertical sectional view through the glare shade mounting;

Figure 4 is a transverse sectional view therethrough.

Referring now more particularly to the drawing, the numeral 10 indicates an ordinary headlight and 11 the illuminating element thereof which represents the axis of the headlight. 12 represents the usual retaining rim for the lens 13 of the headlight. In accordance with my invention, I provide a journal box 14 having a bracket 15 shaped to conform to the shaping of the retaining rim 12 and secured thereto in such fashion that the bearing of the journal box is disposed in vertical alignment with the axis of the headlight when in its normal position.

The journal box has a recess receiving a wooden bearing section 16 which, in turn, receives a shaft 17, the ends of which are provided with flanges 18 preventing longitudinal movement of the shaft within the journal box. One of these flanges has formed thereon, as an integral extension thereof, a jaw 19 which receives the upper edge of a glare shade 20. This glare shade 20 is a substantially semi-circular plate of translucent or tinted glass and has its lower edge 21 normally arranged in a horizontal plane including the axis of the headlight. The width of this glass at its lower edge is considerably greater than the diameter of the headlight lens so that the plate projects to opposite sides of the headlight, as more clearly shown in Figure 2.

A cap 22 is provided for the journal box having a recess of greater size than the shaft within which is arranged a wooden bearing block 23 and a metallic follower plate 24 bearing against this wooden bearing block. The upper portion of the cap has a tubular boss 25, the upper end of which is closed and has directed therethrough an adjusting screw 26 which may be held in adjusted positions by a lock nut 27. Between the inner end of this adjusting screw and a tit 28 formed upon the follower plate 24, a spring 29 is disposed, this spring together with the adjusting screw providing a means for adjusting the tension with which the wood block 23 engages the shaft 17 and accordingly regulates the freedom of movement of this shaft and of the plate 20. It additionally serves to prevent rattling noises during movements of the plate and shaft.

It will be obvious that during operation of the vehicle, there will be a tendency on the part of the plate 20 to maintain its lower edge 21 in horizontal position so that if the vehicle inclines transversely, the upper half of the rays of the headlight are still cut off or modulated to such an extent that they are non-dazzling. It is pointed out that when the vehicle is making a turn, due to the present practice of banking the roads at the turn, such a transverse inclination of the vehicle takes place and accordingly with the ordinary headlight structure, an increased and more dazzling ray is passed from the headlight traveling directly across the road and accordingly interferes with the operation of vehicles passing in the opposite direction. In my device, however, this tendency of the rays to increase in strength is eliminated. It is pointed out that the structure hereinbefore described, while described and illustrated as applied to the headlights of an automobile could quite as conveniently be applied to the headlight of a locomotive and would perform the same functions in exactly the same manner.

Since the construction hereinbefore set forth is obviously capable of a certain range of change and modification without materially departing from the spirit of the invention, I do not limit myself to such specific structure except as hereinafter claimed.

I claim:

1. In combination with a headlight, a journal box supported from the headlight at the upper edge thereof, a shaft in said journal box and provided with a jaw, a translucent panel within the jaw and having its lower edge in horizontal alignment with the horizontal axis of the headlight, said panel being substantially in the form of a semi-circular segment having a diametral width greater than the diameter of the lens of the headlight.

2. In combination with a headlight, a journal box supported from the headlight at the upper edge thereof, a shaft in said journal box and provided with a jaw, a translucent panel within the jaw and having its lower edge in horizontal alignment with the horizontal axis of the headlight, said panel being substantially in the form of a semi-circular segment having a diametral width greater than the diameter of the lens of the headlight and means associated with the journal box for braking the shaft.

3. In combination with a headlight, a freely rotatable rock shaft arranged above and paralleling the horizontal axis of the headlight, a translucent panel secured to the shaft and extending in the path of the upper half of the rays of the headlight and of greater width than said headlight and means associated with the shaft for braking the shaft to prevent undue oscillation of said panel.

4. In combination with a headlight, a support at the upper end of the headlight, a translucent panel mounted upon the support to swing in a plane paralleling the lens of the headlight extending into the path of the rays of the headlight passing through the upper half of the lens thereof, said panel being substantially semi-circular and having a diameter greater than the diameter of the lens.

In testimony whereof I hereunto affix my signature.

CHARLES W. CROWELL.